(12) United States Patent
Zhu

(10) Patent No.: US 11,712,022 B2
(45) Date of Patent: Aug. 1, 2023

(54) PET FEEDER

(71) Applicant: Shenzhen Zhouwu Technology Co., Ltd., Shenzhen (CN)

(72) Inventor: Johnny Zhu, South Bend, IN (US)

(73) Assignee: Shenzhen Zhouwu Technology Co., Ltd., Shenzhen (CN)

(*) Notice: Subject to any disclaimer, the term of this patent is extended or adjusted under 35 U.S.C. 154(b) by 514 days.

(21) Appl. No.: 16/868,931

(22) Filed: May 7, 2020

(65) Prior Publication Data

US 2020/0367469 A1 Nov. 26, 2020

(30) Foreign Application Priority Data

May 20, 2019 (CN) .......................... 201920725110.2

(51) Int. Cl.
*A01K 5/02* (2006.01)

(52) U.S. Cl.
CPC .......... *A01K 5/0225* (2013.01); *A01K 5/0291* (2013.01)

(58) Field of Classification Search
CPC ............................. A01K 5/0225; A01K 5/0291
See application file for complete search history.

(56) References Cited

U.S. PATENT DOCUMENTS

| | | | | |
|---|---|---|---|---|
| 2,500,243 A * | 3/1950 | Dixon | ................... | A01K 5/0291 119/51.13 |
| 2,969,769 A * | 1/1961 | Paschall | ............... | A01K 5/0275 119/53 |
| 3,050,029 A * | 8/1962 | Appleton | ............... | A01K 61/85 119/51.13 |
| 3,468,291 A * | 9/1969 | Allen | ................... | A01K 1/0356 119/51.12 |
| 3,658,036 A * | 4/1972 | Caracappa | ........... | A01K 5/0291 119/51.13 |
| 3,741,162 A * | 6/1973 | Lopez | .................. | A01K 5/0291 119/51.13 |
| 3,893,592 A * | 7/1975 | Friedman | ................ | G01F 11/24 119/51.13 |
| 3,900,007 A * | 8/1975 | Smith | .................. | A01K 5/0291 119/51.13 |
| 3,946,702 A * | 3/1976 | Mazzini | ............... | A01K 5/0291 119/51.13 |
| 3,955,537 A * | 5/1976 | Yujiri | .................... | A01K 5/0275 119/51.13 |
| 3,999,519 A * | 12/1976 | Rodemeyer | .......... | A01K 1/0356 119/51.01 |

(Continued)

*Primary Examiner* — Ebony E Evans
(74) *Attorney, Agent, or Firm* — ScienBiziP, P.C.

(57) ABSTRACT

A pet feeder for automatic and timely provision of food to household pets includes a housing containing one or more types of pet food. The pet feeder includes a feeding tray operably coupled to a base, the feeding tray defines at least one pet food feeding zone located outside the housing; and a food tank positioned in the housing, the food tank defines a plurality of food compartments. At least one rotary valve is disposed at the bottom of the food tank; and a first electric actuator is mounted on the housing and engaged to the rotary valve, the first electric actuator drives the rotary valve to open only one food compartment at a time, to allow food of the only one food compartment to unload downwardly to the feeding tray. A food pusher can move the pet food into the feeding tray accessible to a pet.

18 Claims, 7 Drawing Sheets

(56) References Cited

U.S. PATENT DOCUMENTS

| | | | | |
|---|---|---|---|---|
| 4,000,719 | A * | 1/1977 | Richards | A01K 5/0291 |
| | | | | 119/51.13 |
| 4,248,175 | A * | 2/1981 | Navarro | A01K 5/0291 |
| | | | | 119/51.12 |
| 4,249,483 | A * | 2/1981 | Sobky | A01K 5/0291 |
| | | | | 426/115 |
| 4,485,765 | A * | 12/1984 | Schwartz | A01K 5/0291 |
| | | | | 119/51.13 |
| 4,492,183 | A * | 1/1985 | Chiotasso | A01K 5/0291 |
| | | | | 119/51.13 |
| 4,501,229 | A * | 2/1985 | Williamson | A01K 5/0291 |
| | | | | 119/51.12 |
| 4,671,210 | A * | 6/1987 | Robinson | A01K 5/0291 |
| | | | | 119/51.12 |
| 10,568,301 | B2 * | 2/2020 | Chen | A01K 5/0291 |
| 11,076,578 | B2 * | 8/2021 | Luttrell | A01M 25/002 |
| 11,363,798 | B2 * | 6/2022 | Oates | A01K 5/0291 |
| 2005/0066905 | A1 * | 3/2005 | Morosin | A01K 5/0291 |
| | | | | 119/51.02 |
| 2008/0289580 | A1 * | 11/2008 | Krishnamurthy | A01K 5/0291 |
| | | | | 119/51.11 |
| 2020/0396959 | A1 * | 12/2020 | Bahr | A01K 5/0291 |

\* cited by examiner

PET FEEDER

CROSS-REFERENCE TO RELATED APPLICATIONS

This application claims priority of Chinese Patent Application No. 201920725110.2, filed on May 20, 2019 in the China National Intellectual Property Administration (CNIPA), the entire contents of which are incorporated by reference herein.

FIELD

The embodiments of the present disclosure relate to a technical field of pet supplies, specifically a pet feeder.

BACKGROUND

Household pets, like humans, need to eat regularly. However, pets may not be able to be fed while pet owners are absent. The pet owners can prepare food for one day or longer to avoid this situation, but this method exposes food to the surrounding environment for a long time and new problems may arise, such as food deterioration, which may cause pet health problems.

At the same time, the pet owners need to prepare food for their pets every day. This chore will occupy a lot of time of the pet owners.

Thus, it is reed to provide a pet feeder for household pets.

SUMMARY

In order to solve the above technical problem, a first aspect of the present disclosure provides a pet feeder, which includes:

a base;

a housing connected to the base;

a lid covering the housing;

a feeding tray operably coupled to the base, the feeding tray defining at least one pet food feeding zone located outside the housing;

a food tank positioned in the housing and defining a plurality of food compartments;

at least one rotary valve disposed at a bottom of the food tank;

a first electric actuator rated on the housing and engaged to the at least one rotary valve, the first electric actuator driving the at least one rotary valve to open only one of the plurality of food compartments at a time, to allow food of the only one of the plurality of food compartments to unload downwardly to the feeding tray.

In one embodiment, the plurality of food compartments is provided in different layers surrounding a center of the food tank, and the at least one rotary valve forms a valve hole corresponding to each of the plurality of food compartments, the valve hole of each of the layers is beneath the corresponding food compartment.

In one embodiment, the feeding tray defines at least one pet food temporary storage zone lying beneath the food tank.

In one embodiment, the bottom of the food tank defines a clapboard and the clapboard is provided with a food compartment hole, the first electric actuator drives the at least one rotary valve to rotate, and when the valve hole rotates to coincide with the food compartment hole, to open the only one of the plurality of food compartments at a time, to allow the food of the only one of the plurality of food compartments fall into the at least one pet food temporary storage zone.

In one embodiment, a second electric actuator and a movable pusher mounted on the base, the second electric actuator and the movable pusher are connected by a screw, when the second electric actuator works in a forward direction, the screw is driven to rotate in a first direction, thereby driving the movable pusher to move toward the pet food feeding zone to allow the food in the at least one pet food temporary storage zone moves to the at least one pet food feeding zone, when the second electric actuator works in an opposite direction, the screw rotates in a second and opposite direction, hereby driving the movable pusher to move away from the pet food feeding zone.

In one embodiment, a side of the movable pusher facing the at least one pet food feeding zone includes a pushing surface, the pushing surface covers the entire pet food temporary storage zone.

In one embodiment, a blank is positioned on the pushing surface, the blank prevents the food from moving to both sides of the at least one pet food feeding zone when the movable pusher moves the food.

In one embodiment, the lid defines a desiccant storage structure.

In one embodiment, the pet feeder further includes:

a control panel mounted on the housing, the control panel is coupled to the first electric actuator and the second electric actuator.

In one embodiment, the pet feeder further includes:

a communication module communicating with other devices.

In order to solve the above technical problem, a second aspect of the present disclosure provides a pet feeder, which includes:

a base;

a housing connected to the base;

a lid covering the housing;

a food tank positioned in the housing, and defining a plurality of food compartments;

a feeding tray operably coupled to the base and defining at least one pet food feeding zone located outside the housing and at least one pet food temporary storage zone lying beneath the food tank;

a third electric actuator mounted on the housing, and engaged to the food tank, the third electric actuator drives the food tank to rotate one frame at a time, and then drives only one of the plurality of food compartments to rotate around the food tank, so that the food in the food tank falls to the at least one pet food temporary storage zone.

In one embodiment, the plurality of food compartments is provided in different layers surrounding a center of the food tank.

In one embodiment, the pet feeder further includes:

at least one rotary valve disposed at a bottom of the food tank;

a first electric actuator mounted on the housing and engaged to the at least one rotary valve, the first electric actuator drives the at least one rotary valve to open only one of the plurality of food compartments at a time, to allow food of the only one of the plurality of food compartments to unload downwardly to the feeding tray.

In one embodiment, the bottom of the food tank defines a clapboard and the clapboard is provided with a food compartment hole, the at least one rotary valve forms a valve hole corresponding to each of the plurality of food compartments, the valve hole of each of the layers is beneath the corresponding food compartment, the first electric actuator drives the at least one rotary valve to rotate, and when the valve hole rotates to coincide with the food compartment hole, to open the only one of the plurality of food compartments at a time, to allow the food of the only one of the plurality of food compartments fall into the at least one pet food temporary storage zone.

In one embodiment, a second electric actuator and a movable pusher mounted on the base, the second electric actuator and the movable pusher are connected by a screw, when the second electric actuator works its a forward direction, the screw is driven to rotate in a first direction, thereby driving the movable pusher to move toward the pet food feeding zone to allow the food in the at least one pet food temporary storage zone to move to the at least one pet food feeding zone, when the second electric actuator works in an opposite direction, the screw rotates in a second and opposite direction, hereby driving the movable pusher to move away from the at least one pet food feeding zone.

In one embodiment, a side of the movable pusher facing the at least one pet food feeding zone includes a pushing surface, the pushing surface covers the entire pet food temporary storage zone.

In one embodiment, a blank is positioned on the pushing surface, the blank prevents the food from moving to both sides of the at least one pet food feeding zone when the movable pusher moves the food.

In one embodiment, the lid defines a desiccant storage structure.

In one embodiment, the pet feeder further includes:

a control panel mounted on the housing, the control panel is coupled to the first electric actuator and the second electric actuator.

In one embodiment, the pet feeder further includes:

a communication module communicating with other devices.

The pet feeding system of the present disclosure can automatically feed pets and control the amount of food each time. In another aspect, the pet feeding system can store a plurality of pet food and deliver a plurality each time to feed pets. The problems of pet food storage, pet food quality, timely feeding of pets, and automatic feeding of pets are thus resolved.

DETAILED DESCRIPTION

Figure 1:
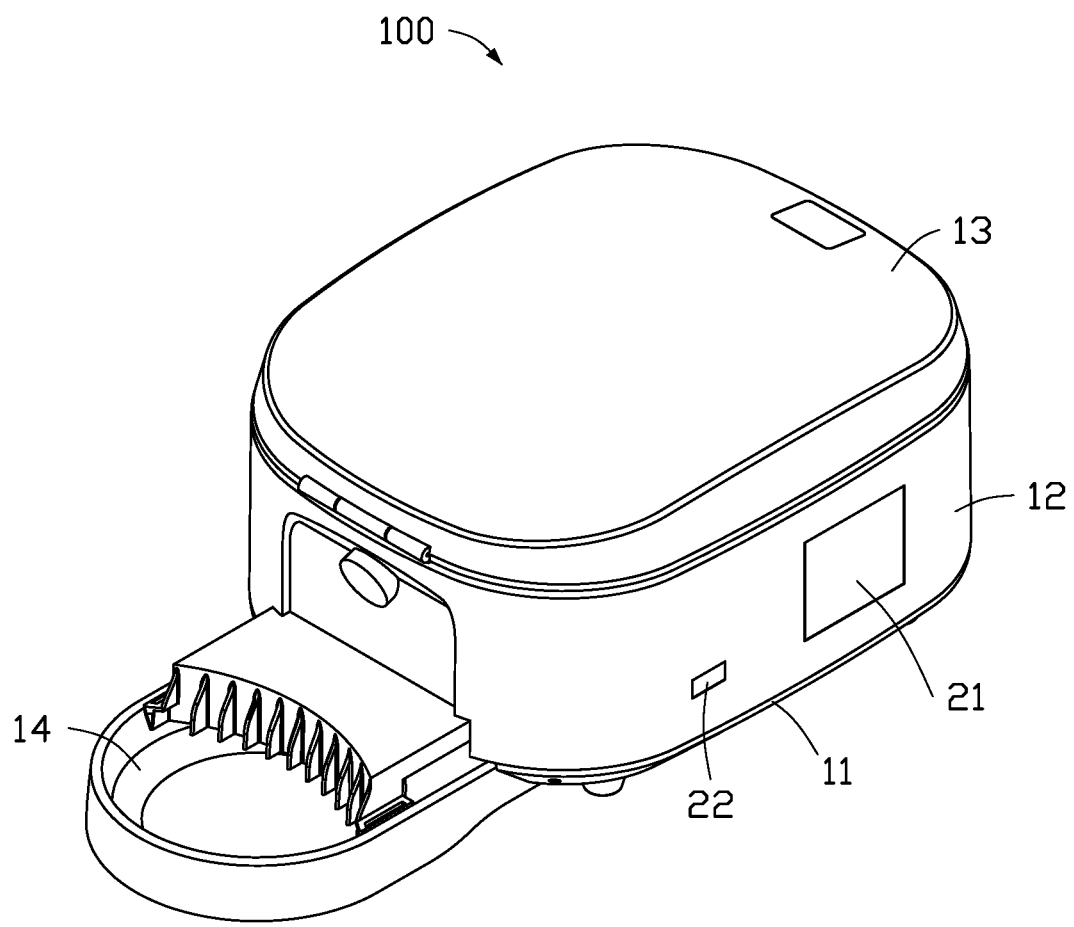
FIG. 1 is a schematic diagram of a three-dimensional structure of an embodiment of a pet feeder of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

Referring to FIG. 1, a pet feeder 100 includes a base 11, a housing 12, and a lid 13.

The housing 12 is connected to the base 11.

The housing 12 can be detachably connected to the base 11. For example, the housing 12 and the base 11 are screwed together, or fixed by a snap-type detachable connection. A detachable connection can also be achieved between the housing 12 and the base 11 in other manner.

In other embodiment, the housing 12 and the base 11 can be integral, that is, the housing 12 and the base 11 can be an integrated structure.

The lid 13 covers the housing 12. The lid 13 and the housing 12 may be detachably connected, or one side of the lid 13 may be hinged to the housing 12.

A desiccant storage structure can be provided in the lid 13. Such a desiccant can be stored in the desiccant storage structure, the desiccant can keep the inside of the housing 12 dry and prevent food from spoiling.

Figure 2:
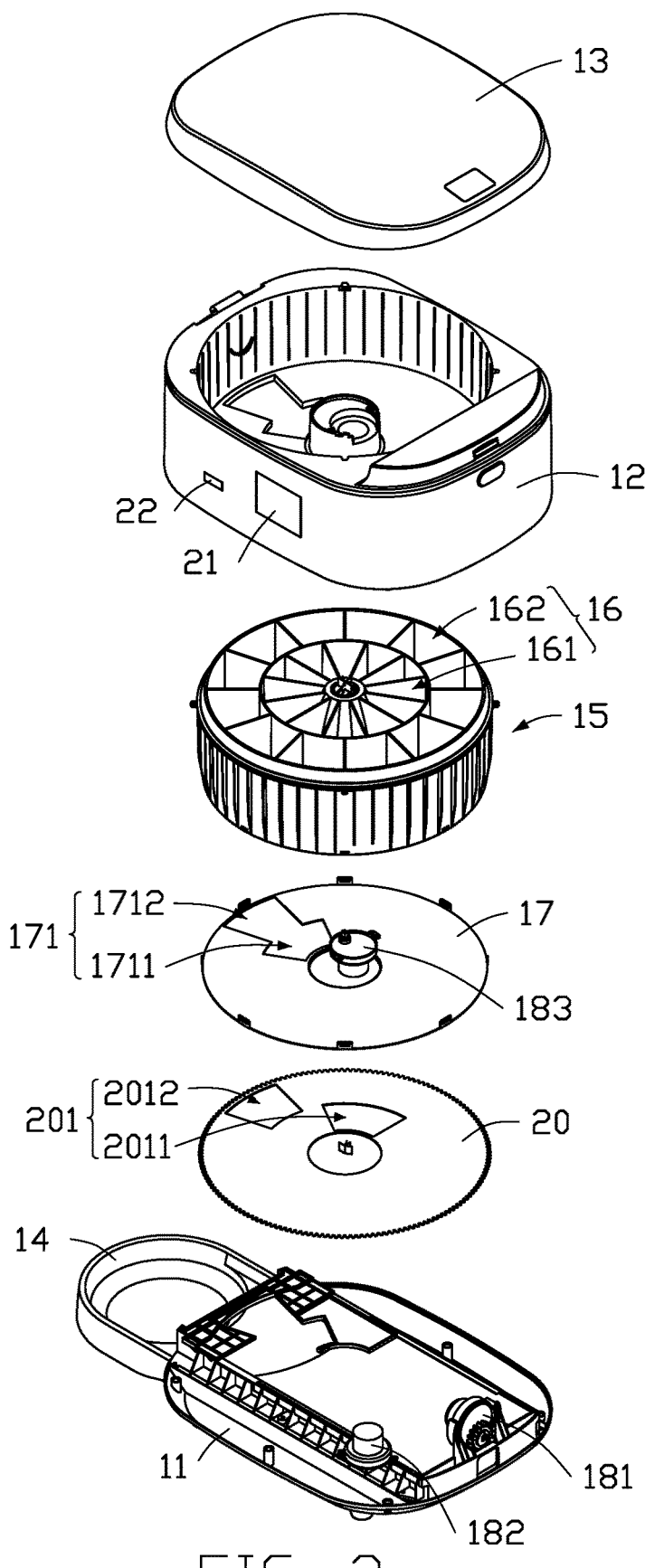
FIG. 2 is an exploded schematic view of an embodiment of the pet feeder of the present disclosure.
Figure 3:
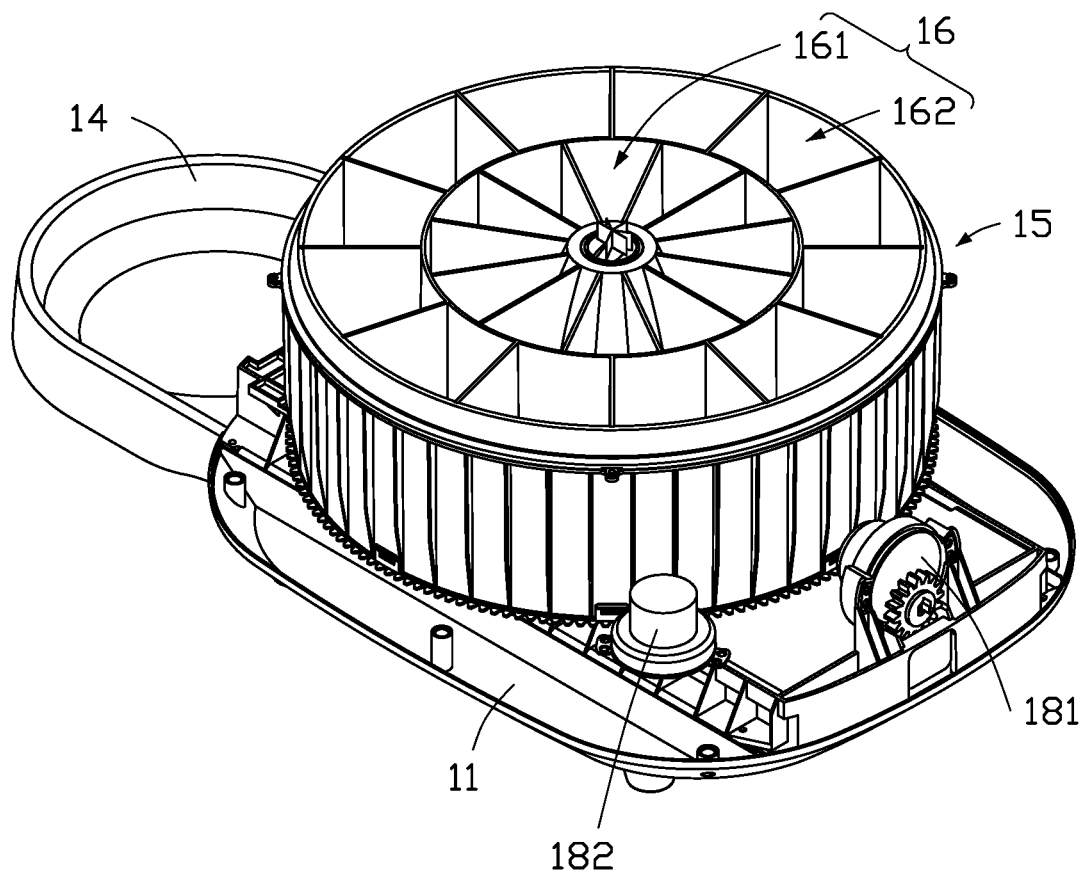
FIG. 3 is a schematic diagram of a food tank of an embodiment of the pet feeder of the present disclosure.

Referring to FIG. 2 and FIG. 3, a food tank 15 for storing food for feeding pets is positioned in the housing 12.

Figure 4:
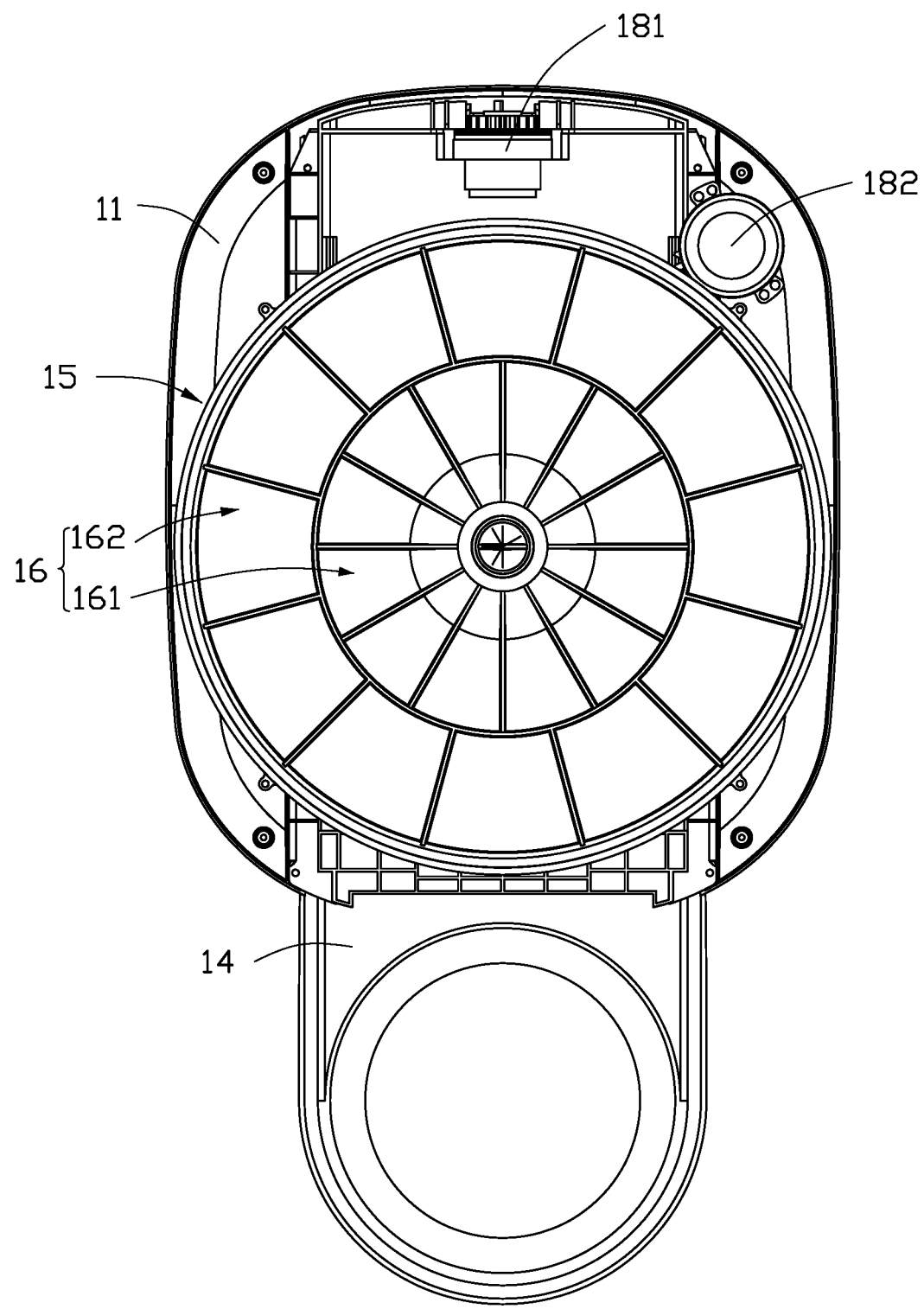
FIG. 4 is a top view of the food tank of an embodiment of the present disclosure.

Referring to FIG. 3 and FIG. 4, the food tank 15 defines a plurality of food compartments 16, and each of the plurality of food compartments 16 can be used to store a certain amount of pets food.

The food tank 15 can rotate in response to predetermined programs or real-time commands, so that the food compartment 16 can rotate in steps to a preset position in response to the predetermined programs or the real-time commands.

The food compartments 16 can be in different layers surrounding a center of the food tank 15, and arranged radially around the center of the food tank 15.

FIG. 3 and FIG. 4 show the food compartments 16 arranged in two layers surrounding the center of the food tank 15. A first food compartment 161 and a second food compartment 162 are included, and the food compartments 16 of each of the two layers are arranged in radially.

FIG. 3 and FIG. 4 show only one embodiment of the number of the layers of the food compartments 16, in other embodiments, the number of the layers of the food compartments 16 can be different.

Figure 7:
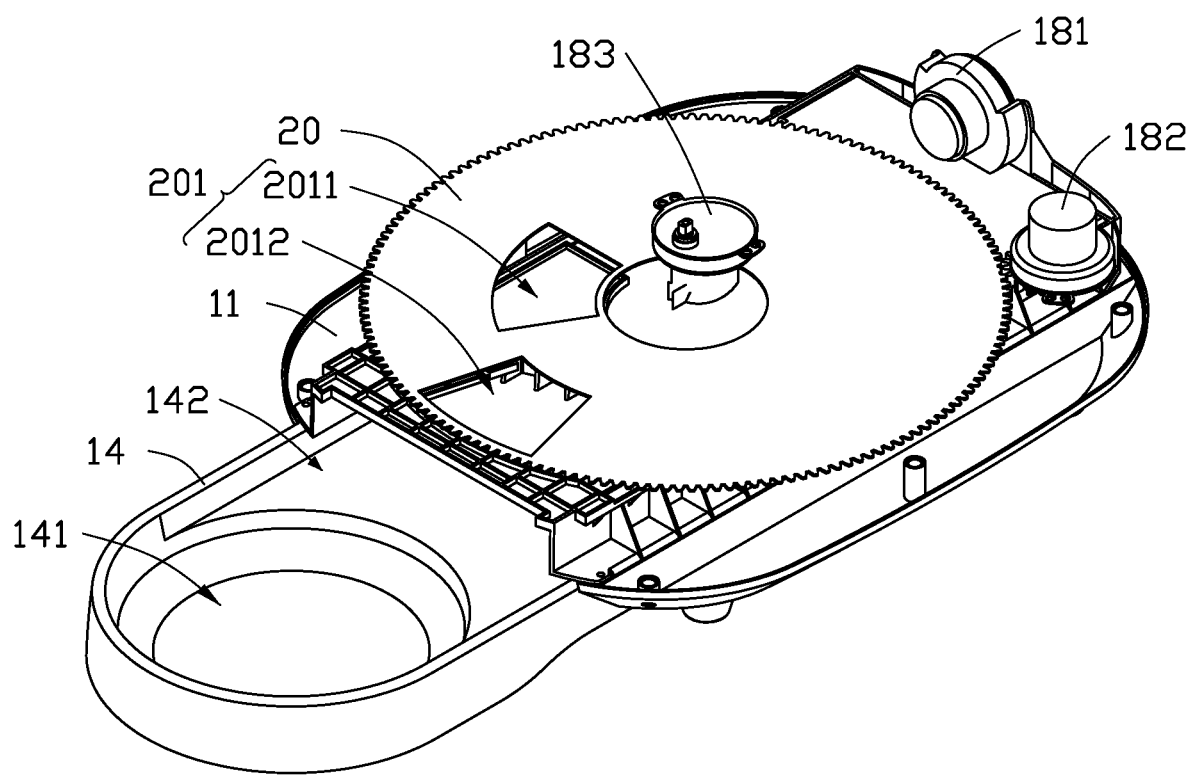
FIG. 7 is a schematic diagram of a rotary valve of an embodiment of the pet feeder of the present disclosure.

Referring to FIG. 7, the pet feeder 100 may include a third electric actuator 183 that is mounted on the base 11. The third electric actuator 183 is coupled to the food tank 15.

The third electric actuator 183 can drive the food tank 15 to rotate in a clockwise or counterclockwise direction, thereby driving the food compartments 16 to rotate clockwise or counterclockwise around the center of the food tank 15.

In an embodiment, the third electric actuator 183 can drive the food compartments 16 to rotate in steps of one compartment a time in a clockwise or counterclockwise direction around the center of the food tank 15 in response to the predetermined programs or the real-time commands, thus, each of the food compartments 16 can advance successively in a clockwise or counterclockwise direction around the center of food tank 15.

For example, the third electric actuator 183 may be controlled by an implanted chip carrying predetermined embedded programs. While it is required to drive the food compartments 16 to rotate one compartment in a clockwise direction around the center of the food tank 15, the chip generates a first operation command that rotates one compartment in a clockwise direction, and the third electric actuator 183 drives the food compartments 16 to rotate one compartment in a clockwise direction in response to the first operation command. While it is required to drive the food compartments 16 to rotate one compartment in a counterclockwise direction around the center of the food tank 15, the chip generates a second operation command that rotates one compartment in a counterclockwise direction, and the third electric actuator 183 drives the food compartments 16 to rotate one compartment in a counterclockwise direction in response to the second operation command.

For another example, a real-time command for controlling the third electric actuator 183 can be provided by a third control device, which can be a device installed on the pet feeder 100 or a device that communicates with the pet feeder 100 remotely. While it is required to drive the food compartments 16 to rotate one compartment in a clock se direction around the center of the food tank 15, a user/pet owner sends a third operation command that rotates one compartment in a clockwise direction by the third control device to the third electric actuator 183, and their third electric actuator 183 drives the food compartments 16 to rotate only one of the food compartment it a clockwise direction in response to the third operation command. While it is required to drive the food compartments 16 to rotate one compartment in a counterclockwise direction around the center of the food tank 15, the user/pet owner sends a fourth operation command that rotates one compartment in a counterclockwise direction by the third control device to the third electric actuator 183, and then the third electric actuator 183 drives the food compartments 16 to rotate only one of food compartment in a counterclockwise direction in response to the fourth operation command.

Figure 5:
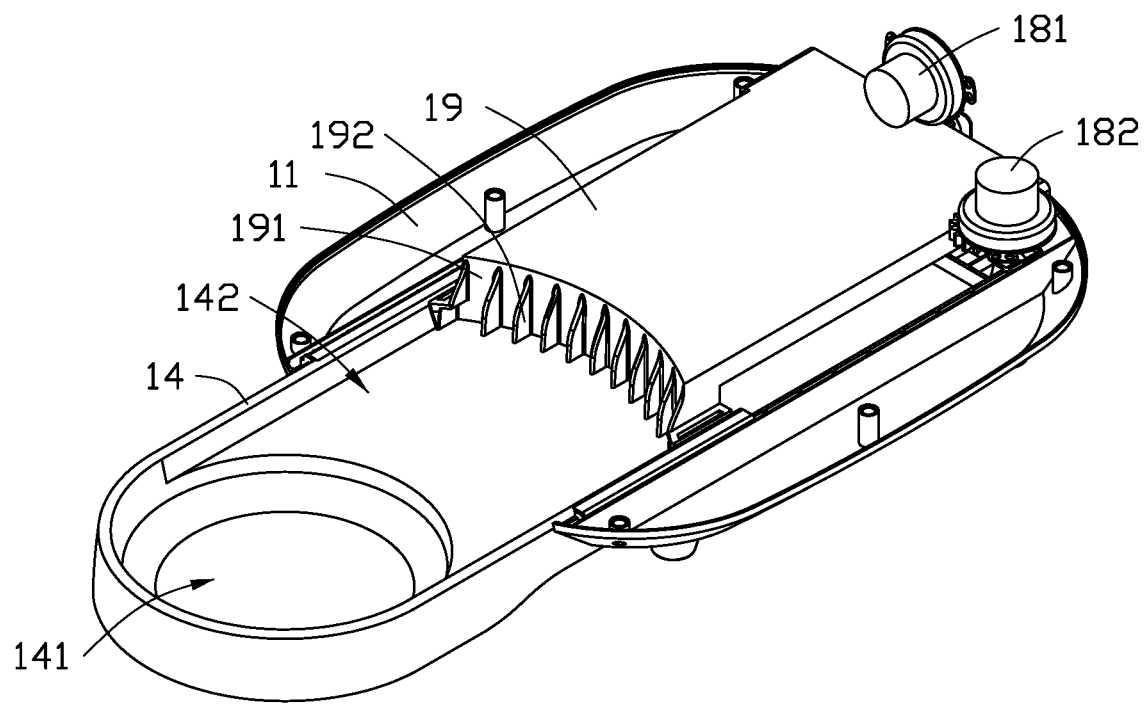
FIG. 5 is a schematic diagram of a feeding tray of an embodiment of the pet feeder of the present disclosure.

Referring to FIG. 2 and FIG. 5, the pet feeder 100 may include a feeding tray 14 that is operably coupled to the base 11. A manner of connecting the feeding tray 14 and the base 11 may be detachable or non-detachable.

The feeding tray 14 can define at least one pet food feeding zone 141. The pet food feeding zone 141 presents food to feed the pets and can be located outside the housing 12.

The feeding tray 14 can also define at least one pet food temporary storage zone 142. The pet food temporary storage zone 142 is beneath the food tank 15. When the pets need to be fed, the food tank 15 is opened, the food in the food tank 15 is unloaded via gravity to the pet food temporary storage zone 142, and then the food is moved from the pet food temporary storage zone 142 to the pet food feeding zone 141.

Referring to FIG. 2 and FIG. 5, the pet feeder 100 could also include a first electric actuator 181 that is mounted on the base 11.

Referring to FIG. 5, the pet feeder 100 can also include a pusher 19. The pusher 19 is mounted on the base 11, the pusher 19 is movable, and operably coupled to the first electric actuator 181.

In an embodiment, the first electric actuator 181 drives the pusher 19 to move toward or away from the pet food feeding zone 141.

When the first electric actuator 181 drives the pusher 19 toward the pet food feeding zone 141, the pusher 19 moves the food in the pet food temporary storage zone 142 to the pet food feeding zone 141. Thereafter, the first electric actuator 181 retracts the pusher 19 away from the pet food feeding zone 141, so that the first electric actuator 181 can drive the pusher 19 to move toward the pet food feeding zone 141 again when there is food falling from the food tank 15 next time, thereby causing the pusher 19 again to move the food its the pet food temporary storage zone 142 to the pet food feeding zone 141.

Figure 6:
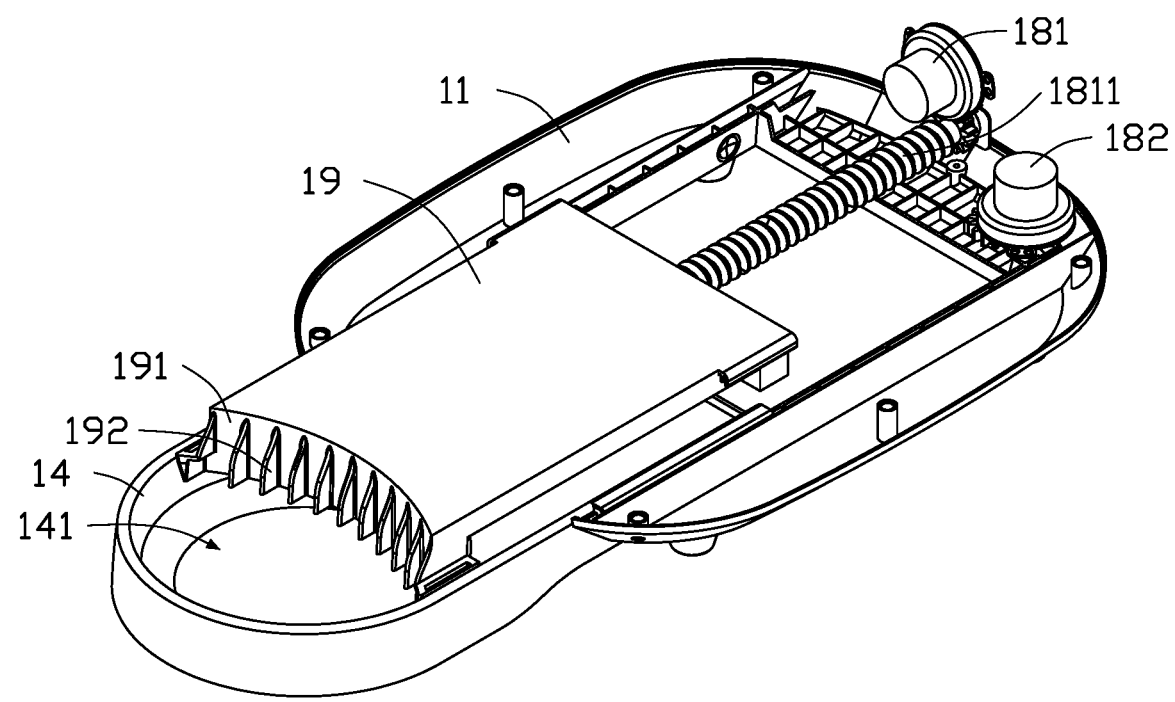
FIG. 6 is a schematic diagram of a pusher of an embodiment of the pet feeder of the present disclosure.

FIG. 5 shows a state of the pusher 19 in its initial or retracted position, in which state the food in the food tank 15 can be unloaded to the pet food temporary storage zone 142 of the feeding tray 14. Then, the first electric actuator 181 drives the pusher 19 to move toward the pet food feeding zone 141, and the pusher 19 pushes the food in the pet food temporary storage zone 142 to the pet food feeding zone 141 of the feeding tray 14. FIG. 6 shows the pusher 19 completing a movement of pushing the food, in this state, the food unloaded to the pet food temporary storage zone 142 of the feeding tray 14 has been completely moved by the pusher 19 into the pet food feeding zone 141.

Referring to FIG. 6, the first electric actuator 181 and the pusher 19 can be connected by a screw 1811. One end of the screw 1811 is connected to the first electric actuator 181 through a gear set, and a body of the screw 1811 is meshed with the pusher 19.

The screw 1811 can be driven to rotate in a first direction, thereby the pusher 19 is moved toward the pet food feeding zone 141 of the feeding tray 14. When the first electric actuator 181 is working in an opposite direction, the screw 1811 rotates in a second and opposite direction, thereby the pusher 19 is pulled back from the pet food feeding zone 141 of the feeding tray 14.

Referring to FIG. 5, a side of the pusher 19 facing the pet food feeding zone 141 has a pushing surface 191 which covers the entire pet food temporary storage zone 142, to ensure that all food in the pet food temporary storage zone 142 can be pushed into the pet food feeding zone 141.

In an embodiment, The pushing surface 191 may be an inwardly curved (concave) surface. Alternatively, the pushing surface 191 may be a straight surface or other surface.

Referring to FIG. 5, a blank 192 can be positioned on the pushing surface 191. When the pusher 19 moves the food, the blank 192 can prevent the food from moving to both sides of the at least one pet food feeding zone, so as not to affect an advancement efficiency.

The first electric actuator 181 can be controlled by a predetermined program.

In an embodiment, a chip carrying an embedded predetermined program may be in the first electric actuator 181. When it is required to move the food in the pet food temporary storage zone 142 to the pet food feed zone 141, the chip transmits a predetermined positive direction working instruction. The first electric actuator 181 works in a positive direction in response to the predetermined positive direction working instruction, and drives the pusher 19 to move toward the pet food feeding zone 141, so that the pusher 19 pushes the food stored in the pet food temporary storage zone 142 to the pet food feeding zone 141. After the food movement is completed, the chip transmits a predetermined opposite direction working instruction. The first electric actuator 181 works in an opposite direction in response to the predetermined opposite direction working instruction and drives the pusher 19 to move away from the pet food feeding zone 141, so that the pusher 19 moves to the pet food temporary storage zone 142 to wait for a next positive direction working instruction.

The first electric actuator 181 can also be controlled by a real-time operation command.

In an embodiment, a real-time command for controlling the first electric actuator 181 can be provided by a first control device which can be a device installed on the pet feeder 100 or a device that communicates with the pet feeder 100 remotely. When it is required to move the food in the pet food temporary storage zone 142 to the pet food feeding zone 141, the user/pet owner sends a positive direction working instruction by the first control device to the first electric actuator 181. The first electric actuator 181 works in a positive direction in response to the positive direction working instruction, and drives the pusher 19 to move toward the pet food feeding zone 141, so that the pusher 19 pushes the food stored in the pet food temporary storage zone 142 to the pet food feeding zone 141. After the food movement is completed, the user/pet owner send an opposite direction working instruction by the first control device to the first electric actuator 181. The first electric actuator 181 works in an opposite direction in response to the opposite direction working instruction and drives the pusher 19 to move away from the pet food feeding zone 141, so that the pusher 19 moves to the pet food temporary storage zone 142 to wait for a next positive direction working instruction.

Referring to FIG. 2, a bottom of the food tank 15 defines a clapboard 17, and the clapboard 17 is provided with a food compartment hole 171.

The food compartment hole 171 can be fixedly positioned above the pet food temporary storage zone 142 of the feeding tray 14, and the food compartment hole 171 allows the food in the food tank 15 to be unloaded from the food compartment hole 171 to the pet food temporary storage zone 142 of the feeding tray 14 via gravity.

In an embodiment, a cross-sectional area of the food compartment hole 171 can be equal to or smaller than a cross-sectional area of the food compartment 16.

Each of the food compartments 16 of the food tank 15 can be rotated to the position of the food compartment hole 171 in a clockwise or counterclockwise direction by the third electric actuator 181. When one of the food compartments 16 rotates to the position of the food compartment hole 171, the food in the one of the food compartments 16 falls into the pet food temporary storage zone 142 of the feeding tray 14. Then, the third electric actuator 183 again drives a next one of the food compartments 16 of the food tank 15 to rotate to the position of the food compartment hole 171 in a clockwise or counterclockwise direction, so that the food in the next one of the food compartments 16 falls into the pet food temporary storage zone 142 of the feeding tray 14. In this way, the food compartment hole 171 allows food of only one of the food compartments 16 at a time to be unloaded into the pet food temporary storage zone 142 of the feeding tray 14.

In an embodiment, when the food compartments 16 of the food tank 15 are arranged as a plurality of layers, the clapboard 17 can define a food compartment hole 171 corresponding to each of the food compartments 16. The position of the food compartment hole 171 of each layer is positioned below the corresponding food compartment 16.

The food compartment hole 171 of each layer can be fixedly positioned above the pet food temporary storage zone 142 of the feeding tray 14. The food compartment hole 171 of each layer allows food in the food compartment 16 of a certain layer to be unloaded from the food compartment hole 171 into the pet food temporary storage zone 142 of the feeding tray 14 via gravity. Thereby, a purpose of transferring the food stored in the food compartment 16 of the corresponding layer downwards to the pet food temporary storage zone 142 of the feeding tray 14 can be achieved.

In an embodiment, the cross-sectional area of the food compartment hole 171 of each layer is equal to or smaller than the cross-sectional area of the food compartment 16 of the corresponding layer.

Each of the food compartments 16 of each layer of the food tank 15 can be successively rotated in the clockwise or counterclockwise direction to the position of the food compartment hole 171 by the third electric actuator 183. When the food compartment 16 of each layer is rotated to the food compartment hole 171, the food in the food compartment 16 can unload via gravity downwards to the pet food temporary storage zone 142 of the feeding tray 14. After the food in one of the food compartments 16 has been unloaded to the pet food temporary storage zone 142 of the feeding tray 14, the third electric actuator 183 can drive the next one of the food compartments 16 of the food tank 15 to rotate to the position of the food compartment hole 171 in a clockwise or counterclockwise direction to allow food in the next one of the food compartments 16 to unloaded via gravity to the pet food temporary storage zone 142 of the feeding tray 14. In this way, it is possible to configure the food compartment hole 171 corresponding to each layer to allow food of only one of the food compartments 16 of each layer to be unloaded into the pet food temporary storage zone 142 of the feeding tray 14 at a time.

For example, referring to FIG. 2, when the food compartments 16 of the food tank 15 is set in two layers, the clapboard 17 defines a first food compartment hole 1711 and a second food compartment hole 1712. The first food compartment hole 1711 lies beneath the first food compartment 161. A cross-sectional area of the first food compartment hole 1711 is equal to or smaller than a cross-sectional area of the first food compartment 161. The second food compartment hole 1712 lies beneath the second food compartment 162. A cross-sectional area of the second food compartment hole 1712 is equal to or smaller than a cross-sectional area of the second food compartment 162.

Referring to FIG. 2 and FIG. 7, the pet feeder 100 could also be provided with at least one rotary valve 20. The rotary valve 20 is disposed at the bottom of the food tank 15 and lies beneath the clapboard 17. The rotary valve 20 controls the opening and closing of the food compartment 16 of the food tank 15.

In an embodiment, the first food compartment 161 of the food tank 15 can rotate in a clockwise or counterclockwise direction to the position of the first food compartment hole 1711 by the third electric actuator 183, so that the first food compartment 161 of the food tank 15 can be opened in sequence, and only one of the first food compartments 161 is allowed to open at a time. That is, only one of the first food compartments 161 of each layer is allowed to release the food into the pet food temporary storage zone 142 of the feeding tray 14 by the rotary valve 20.

In an embodiment, the second food compartment 162 of the food tank 15 can rotate in a clockwise or counterclockwise direction to the position of the second food compartment hole 1712 by the third electric actuator 183, so that the second food compartment 162 of the food tank 15 can be opened in sequence, and only one of the second food compartments 162 is allowed to open at a time. That is, only one of the second food compartments 162 of each layer is allowed to release the food into the pet food temporary storage zone 142 of the feeding tray 14 by the rotary valve 20.

Referring to FIG. 2 and FIG. 7, a valve hole 201 is formed on the rotary valve 20. A cross-sectional area of the valve hole 201 is equal to or smaller than the cross-sectional area of the second food compartment 162.

Referring to FIG. 2 and FIG. 7, the pet feeder 100 can also be provided with a second electric actuator 182 mounted on the base 11. The second electric actuator 182 is engaged to the rotary valve 20, and the second electric actuator 182 can rotate the rotary valve 20 in a clockwise or counterclockwise direction.

In an embodiment, the second electric actuator 182 is controlled by predetermined programs.

For example, the second electric actuator 182 may be controlled by an implanted chip carrying predetermined embedded programs. When the rotary valve 20 is required to rotate in a clockwise direction, the chip transmits a predetermined clockwise rotation control command, the second electric actuator 182 drives the rotary valve 20 to rotate clockwise in response to the predetermined clockwise rotation control command. When the rotary valve 20 is required to rotate in a counterclockwise direction, the chip transmits a predetermined counterclockwise rotation control command, and the second electric actuator 182 drives the rotary vale 20 to rotate counterclockwise in response to the predetermined counterclockwise rotation control command.

For another example, the second electric actuator 182 can be also controlled by a real-time operation command.

For example, the real-time operation command can be provided by a second control device which can be a device installed on the pet feeder 100 or a device that communicates with the pet feeder 100 remotely. When the rotary valve 20 is required to rotate in a clockwise direction the user/pet owner sends a clockwise rotation control command to the second electric actuator 182 by the second control device, and the second electric actuator 182 drives the rotary valve 20 to rotate clockwise in response to the clockwise rotation control command. When the rotary valve 20 is required to rotate in a counterclockwise direction, the user/pet owner sends a counterclockwise rotation control command to the second electric actuator 182 by the second control device, and the second electric actuator 182 drives the rotary valve 20 to rotate counterclockwise in response to the counterclockwise rotation control command.

If one of the food compartments 16 needs to be opened, the second electric actuator 182 drives the rotary valve 20 in a clockwise or counterclockwise direction to rotate, and when the valve hole 201 rotates to coincide with the food compartment hole 171, the one of the food compartments 16 is opened, and the food in the one of the food compartments 16 falls into the pet food temporary storage zone 142 of the feeding tray 14. After the food in the one of the food compartments 16 has finished falling into the pet food temporary storage zone 142 of the feeding tray 14, the second electric actuator 182 can drive the rotary valve 20 to reversely rotate, so that the valve hole 201 and the food compartment hole 171 no longer coincide, and the one of the food compartments 16 is closed. When a next one of the food compartments 16 needs to be opened, the third electric actuator 183 drives the food tank 15 to rotate clockwise or counterclockwise, so that the next one of the food compartments 16 rotates to the position of the food compartment hole 171. The second electric actuator 182 again drives the rotary valve 20 to rotate, so that the valve hole 201 again coincides with the food compartment hole 171. Then the next one of the food compartments 16 is opened and the food in the next one of the food compartments 16 is released under the action of gravity into the pet food temporary storage zone 142 of the feeding tray 14.

A cooperation of the valve hole 201 with the food compartment hole 171 allows the rotary valve 20 to open only one of the food compartments 16 at a time. That is, the pet feeder 100 allows food of only one of the food compartments 16 to unload downwardly to the pet food temporary storage zone 142 of the feeding tray 14 at a time.

In an embodiment, when the food compartments 16 of the food tank 15 are provided in multiple layers, the rotary valve 20 forms a valve hole 201 corresponding to each of the food compartments 16. The valve hole 201 of each layer is beneath the corresponding food compartment 16. The cross-sectional area of the valve hole 201 of each layer is equal to or smaller than the cross-sectional area of the food compartment 16 of the corresponding layer.

The rotary valve 20 can be rotated in a clockwise or counterclockwise direction by the second electric actuator 182, so that the valve hole 201 corresponding to the food compartments 16 of each layer is rotated to coincide with the food compartment hole 171 corresponding to the food compartment 16 of corresponding layer. The food compartment 16 of a layer is thus opened, and food in the food compartment 16 is released. In this way, the rotary valve 20 opens only one of the food compartments 16 of each layer at a time. That is, the pet feeder 100 allows food of only one of the food compartments 16 of each layer to unload downwardly to the pet food temporary storage zone 142 of the feeding tray 14 at a time.

For example, referring to FIG. 2 and FIG. 7, if the food compartments 16 of the food tank 15 are set in two layers, a first valve hole 2011 and a second valve hole 2012 can be formed on the corresponding rotary valve 20, the second valve hole 2012 is configured to be open later than the first valve hole 2011. The first valve hole 2011 lies beneath the first food compartment 161, and a cross-sectional area of the first valve hole 2011 is equal to or smaller than the cross-sectional area of the first food compartment 161. The second valve hole 2012 lies beneath the second food compartment 162, and a cross-sectional area of the second valve hole 2012 is equal to or smaller than the cross-sectional area of the second food compartment 162.

In one embodiment, the first food compartment 161 of the food tank 15 is rotated in a clockwise or counterclockwise direction to the position of the first valve hole 2011 by driving of the third electric actuator 183. So that the first food compartment 161 of the food tank 15 is opened, and only one of the first food compartments 161 is allowed to open at a time. That is, the rotary valve 20 allows food of only one of the first food compartments 161 to unload downwardly to the pet food temporary storage zone 142 of the feeding tray 14 at a time.

In one embodiment, the second food compartment 162 of the food tank 15 can rotate in a clockwise or counterclockwise direction to the position of the second valve hole 2012 by driving of the third electric actuator 183. So that the second food compartment 162 of the food tank 15 can be successively opened, and only one of the second food compartments 162 is allowed to open at a time. That is, the rotary valve 20 allows food of only one of the second food compartments 162 to unload downwardly to the pet food temporary storage zone 142 of the feeding tray 14 at a time.

The valve hole 201 corresponding to each layer can be staggered. Thus when the valve hole 201 corresponding to a certain layer overlaps with the food compartment hole 171 of the corresponding layer, the valve holes 201 corresponding to the other layers do not overlap with the corresponding food compartment holes 171 of the corresponding layers. That is, when one of the food compartments 16 of a certain layer is opened, the food compartments 16 of the other layers are not opened at the same time, thereby ensuring that the pet feeder 100 opens only one of the food compartments 16 at a time.

For example, referring to FIG. 2 and FIG. 7, if the food compartments 16 of the food tank 15 are set in two layers, the first valve hole 2011 and the second valve hole 2012 can be staggered in relation to each other. So when the first valve hole 2011 is rotated below the first food compartment hole 1711, the second valve hole 2012 is not located below the second food compartment hole 1712. That is, when the first food compartment 161 is opened, the second food compartment 162 does not open. When the second valve hole 2012 is rotated below the second food compartment hole 1712, the first valve hole 2011 is not located below the first food compartment hole 1711. That is, when the second food compartment 162 is opened, the first food compartment 161 does not open.

In an embodiment, referring to FIG. 2 and FIG. 2, the pet feeder 100 can also be provided with a control panel 21 mounted on the housing 12.

The control panel 21 can be coupled to the first electric actuator 181, the second electric actuator 182, and the third electric actuator 183. The control panel 21 can set parameters of the predetermined program for controlling the first electric actuator 181, the second electric actuator 182, and the third electric actuator 183. Or the control panel 21 can be directly used to set parameters of the real-time operation command for controlling the first electric actuator 181, the second electric actuator 182, and the third electric actuator 183.

In an embodiment, referring to FIG. 1 and FIG. 2, the pet feeder 100 can also be provided with a communication module 22. The communication module 22 communicates with other devices, such as smartphones and tablets. A remote user can thus control the pet feeder 100 through the external terminal device.

The external terminal device can be any electronic product that can interact with the user. For example, a personal computer, a tablet computer, a smart phone, a Personal Digital Assistant (PDA), a game console, an Internet Protocol Television (IPTV), a smart wearable devices, and the like.

A communication mode of the communication module 22 of the pet feeder 100 can be wired or wireless.

The network the communication module 22 of the pet feeder 100 can be the Internet, a wide area network, a metropolitan area network, a local area network, a virtual private network (VPN), and the like.

The details of the present disclosure are not limited to the above described exemplary embodiments. Other specific forms can be embodied without departing from spirit or essential characteristics of all the present embodiments. The present embodiments are to be considered as illustrative and not restrictive, and scope of the present disclosure is limited by appended claims. All changes in meanings and scopes of equivalent elements are included in all the present disclosure. All accompanying drawings in the claims should not be construed as limiting the claims. In addition, it is to be understood that the word 'comprising' does not exclude other elements or steps, singular or plural. A plurality of units or devices recited in system claims can also be implemented by a unit or a device by software or hardware. The word 'second' is used to denote a name instead of any particular order.

It should be noted that the above embodiments are only for explaining the technical solutions of the present disclosure, and the above embodiments are not intended to be limiting. Although all the present disclosures has been described in detail with reference to preferred embodiments, average technician in the field will understand that modifications or equivalent substitutions may be made without departing from the spirit and the scope of the claims.

I claim:

1. A pet feeder, comprising:
a base;
a housing connected to the base;
a lid covering the housing;
a feeding tray operably coupled to the base, the feeding tray defining at least one pet food feeding zone located outside the housing;
a food tank positioned in the housing and defining a plurality of food compartments, wherein the plurality of food compartments is provided in different layers surrounding a center of the food tank, and at least one rotary valve forms a valve hole corresponding to each of the plurality of food compartments, the valve hole of each of the layers is beneath the corresponding food compartment;
the at least one rotary valve disposed at a bottom of the food tank;
a first electric actuator mounted on the housing and engaged to the at least one rotary valve, the first electric actuator driving the at least one rotary valve to open only one of the plurality of food compartments at a time, to allow food of the only one of the plurality of food compartments to unload downwardly to the feeding tray.

2. The pet feeder of claim 1, wherein the feeding tray defines at least one pet food temporary storage zone lying beneath the food tank.

3. The pet feeder of claim 2, wherein the bottom of the food tank defines a clapboard and the clapboard is provided with a food compartment hole, the first electric actuator drives the at least one rotary valve to rotate, and when the valve hole rotates to coincide with the food compartment hole, to open the only one of the plurality of food compartments at a time, to allow the food of the only one of the plurality of food compartments fall into the at least one pet food temporary storage zone.

4. The pet feeder of claim 3, further comprising a second electric actuator and a movable pusher mounted on the base, wherein the second electric actuator and the movable pusher are connected by a screw, when the second electric actuator works in a forward direction, the screw is driven to rotate in a first direction, thereby driving the movable pusher to move toward the at least one pet food feeding zone to allow the food in the at least one pet food temporary storage zone to move to the at least one pet food feeding zone, when the second electric actuator works in an opposite direction, the screw rotates in a second and opposite direction, hereby driving the movable pusher to move away from the at least one pet food feeding zone.

5. The pet feeder of claim 4, wherein a side of the movable pusher facing the at least one pet food feeding zone comprises a pushing surface, the pushing surface covers the entire pet food temporary storage zone.

6. The pet feeder of claim 5, wherein a blank is positioned on the pushing surface, the blank prevents the food from moving to both sides of the at least one pet food feeding zone when the movable pusher moves the food.

7. The pet feeder of claim 6, wherein the lid defines a desiccant storage structure.

8. The pet feeder of claim 7, further comprising:
a control panel mounted on the housing, the control panel coupled to the first electric actuator and the second electric actuator.

9. The pet feeder of claim 8, further comprising:
a communication module.

10. A pet feeder, comprising:
a base;
a housing connected to the base;
a lid covering the housing;
a food tank positioned in the housing and defining a plurality of food compartments, wherein the plurality of food compartments is provided in different layers surrounding a center of the food tank;
a feeding tray operably coupled to the base and defining at least one pet food feeding zone located outside the housing and at least one pet food temporary storage zone lying beneath the food tank;
a first electric actuator mounted on the housing and engaged to the food tank, wherein the first electric actuator drives the food tank to rotate one layer at a time, and then drives only one of the plurality of food compartments to rotate around the food tank, so that the food in the food tank falls to the at least one pet food temporary storage zone.

11. The pet feeder of claim 10, further comprising:
at least one rotary valve disposed at a bottom of the food tank; a second electric actuator mounted on the housing and engaged to the at least one rotary valve, the second electric actuator driving the at least one rotary valve to open only one of the plurality of food compartments at a time, to allow food of the only one of the plurality of food compartments to unload downwardly to the feeding tray.

12. The pet feeder of claim 11, wherein the bottom of the food tank defines a clapboard and the clapboard is provided with a food compartment hole, the at least one rotary valve forms a valve hole corresponding to each of the plurality of food compartments, the valve hole of each of the layers is beneath the corresponding food compartment, the second electric actuator drives the at least one rotary valve to rotate, and when the valve hole rotates to coincide with the food compartment hole, to open the only one of the plurality of food compartments at a time, to allow the food of the only one of the plurality of food compartments fall into the at least one pet food temporary storage zone.

13. The pet feeder of claim 12, further comprising a third electric actuator and a movable pusher mounted on the base, wherein the third electric actuator and the movable pusher are connected by a screw, when the third electric actuator works in a forward direction, the screw is driven to rotate in a first direction, thereby driving the movable pusher to move toward the at least one pet food feeding zone to allow the food in the at least one pet food temporary storage zone to move to the at least one pet food feeding zone, when the third electric actuator works in an opposite direction, the screw rotates in a second and opposite direction, hereby driving the movable pusher to move away from the at least one pet food feeding zone.

14. The pet feeder of claim 13, wherein a side of the movable pusher facing the at least one pet food feeding zone comprises a pushing surface, the pushing surface covers the entire pet food temporary storage zone.

15. The pet feeder of claim 14, wherein a blank is positioned on the pushing surface, the blank prevents the food from moving to both sides of the at least one pet food feeding zone when the movable pusher moves the food.

16. The pet feeder of claim 15, wherein the lid defines a desiccant storage structure.

17. The pet feeder of claim 16, further comprising:
a control panel mounted on the housing, the control panel coupled to the second electric actuator and the third electric actuator.

18. The pet feeder of claim 17, further comprising:
a communication module.

* * * * *